Aug. 7, 1928.
B. F. SEYMOUR
1,679,840
SUSPENSION FOR VEHICLE BODIES
Filed Oct. 1, 1924  2 Sheets-Sheet 1
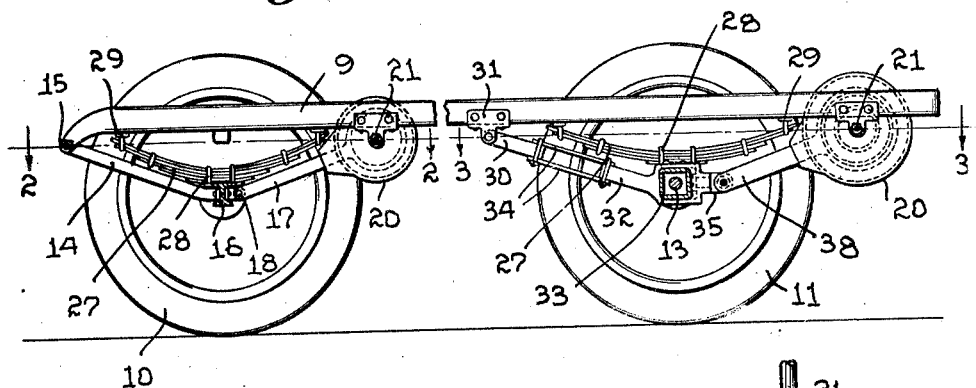
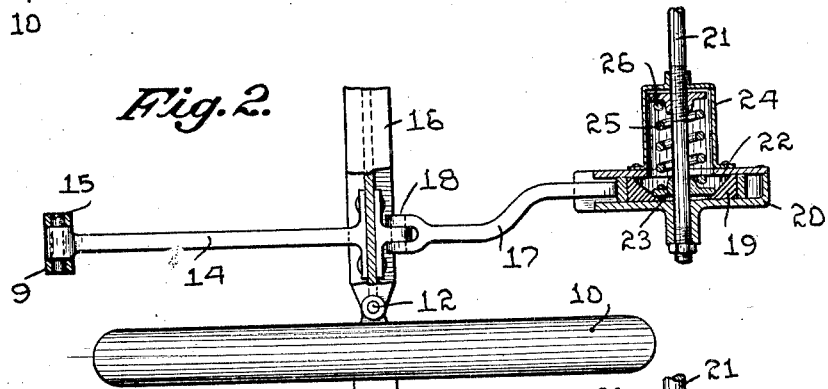
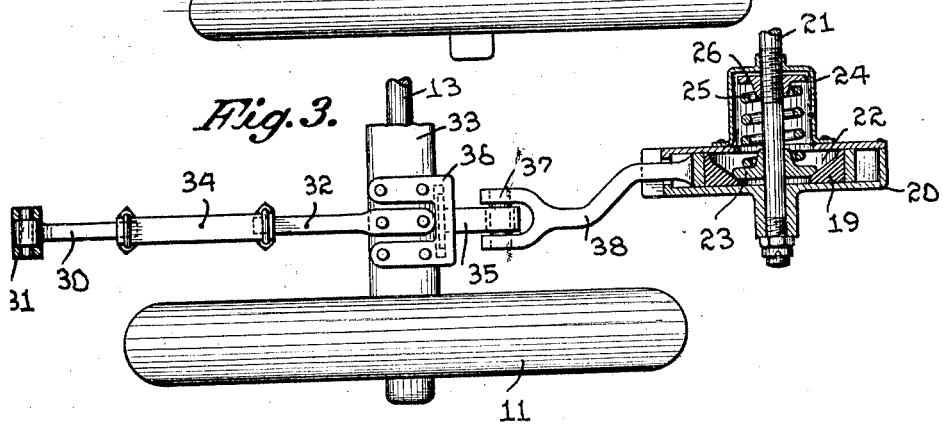
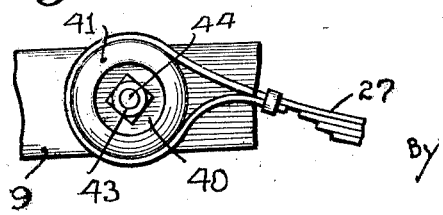
Inventor
Benjamin F. Seymour
By
Attorney Aug. 7, 1928.
B. F. SEYMOUR
1,679,840
SUSPENSION FOR VEHICLE BODIES
Filed Oct. 1, 1924    2 Sheets-Sheet 2
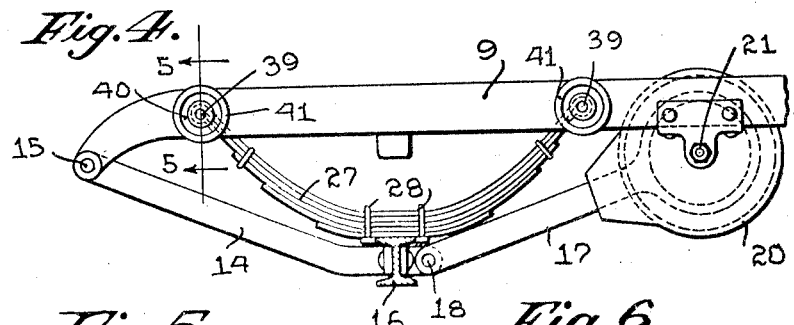
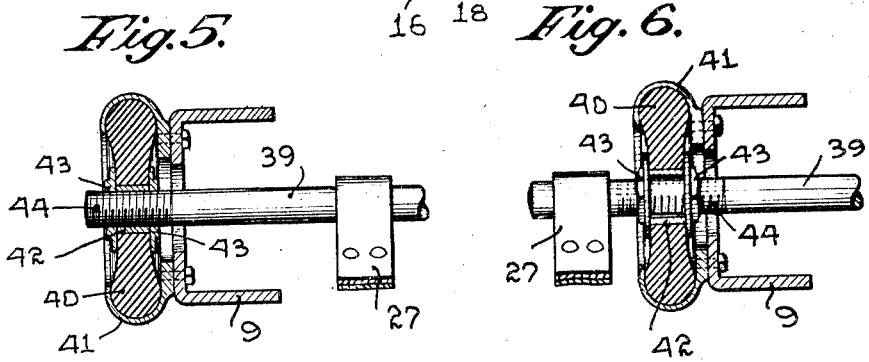
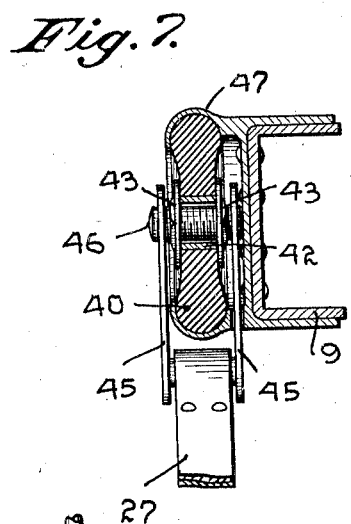
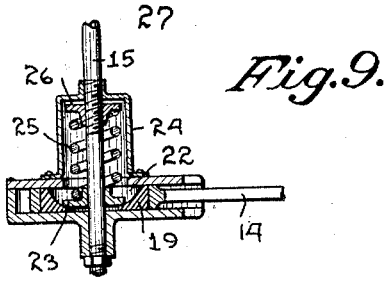
Inventor
Benjamin F. Seymour
By
Attorney Patented Aug. 7, 1928.

1,679,840

UNITED STATES PATENT OFFICE.

BENJAMIN F. SEYMOUR, OF WASHINGTON, DISTRICT OF COLUMBIA.

SUSPENSION FOR VEHICLE BODIES.

Application filed October 1, 1924. Serial No. 741,049.

The present invention relates to vehicle construction and suspension and consists in the combinations and arrangements of elements hereinafter described and particularly set forth in the accompanying claims.

The purpose of the invention is to provide the body of a vehicle, especially of the motor driven type, with resilient means for indirectly absorbing and dissipating all shocks or jars to which the vehicle wheel is subjected, and without causing undue strain on either the wheel, its axle, or transmitting excessive vibration to the supported load.

A further object of the resilient suspension as proposed herein is the employment of apparatus and disposal of the elements thereof in a manner that will secure the maximum stability of the resilient sustaining structure, and equitable location or distribution of the resilient devices per se with regard to the vehicle elements on which the same are mounted.

The disclosure herein constitutes an improvement on the construction and arrangement of suspension shown in my co-pending applications for U. S. Patents entitled "Vehicle body suspension," Serial No. 367,712, filed March 22, 1920; and "Suspension, shock absorber, and snubber," Serial No. 471,240½, filed May 20, 1921.

The construction described herein is a modified arrangement of the "Vehicle body suspension" disclosed in my co-pending application for U. S. Patent Serial No. 741,048 and filed October 1, 1924.

The invention is shown by way of illustration in the accompanying drawings wherein:

Figure 1 is a side elevational view of the suspension applied to the front and rear wheels of the vehicle;

Figure 2 a top plan view thereof taken on the line 2—2 of Figure 1.

Figure 3 a similar top plan view taken on the line 3—3 of Figure 1.

Figure 4 an enlarged side elevational view of the front wheel suspension.

Figure 5 a detailed transverse sectional view taken on the line 5—5 of Figure 4.

Figure 6 a similar view of modified construction.

Figure 7 a like view of a further modification.

Figure 8 another modified arrangement.

Figure 9 a horizontal cross section of a modified manner of mounting the forward arm or lever on the chassis or frame as compared with Figures 2 and 3; and Figure 10 a partial side elevation of a modified form of attaching a leaf spring to the resilient elements as seen in Figures 7 and 8.

Referring to the construction in further detail and wherein like reference characters designate corresponding parts in the different views the apparatus consists of the chassis or frame 9 having the steering wheel 10 and driving wheel 11 (one of each being shown) journalled on the steering head 12 and axle 13.

The suspension per se for the front or steering wheel (see Figure 1) consists of an arm 14 fulcrumed at one end 15 to the chassis and at its other end suitably secured to the axle 16. A second arm 17 pivotally connects at 18 to the axle 16 and on its free end carries an annular or ring-like block 19 mounted to have limited working movement in a casing 20 suitably secured to the shaft 21. Said block 19 is constructed to provide a cone element 22 that coacts with a complementary cone element on the disklike head 23 mounted to have limited sliding movement on the shaft 21. A spring 25 within the housing 24 normally holds the cone element 23 in proper frictional contact with the cone element 22, and a nut 26 screw-threaded on shaft 21 provides an adjustable abutment for the tensioning spring 25 (see Figure 2).

An additional resilient element for each front wheel consists of a spring 27, preferably of the elliptical multiply type, that is suitably secured on the axle 16 (see Figures 1 and 2) by clamping members 28, and the free ends of said spring element are mounted to have limited working movement in the pair of cleats 29 that are suitably secured to the underside of the chassis 9 as shown.

The resilient support for each rear wheel consists of a front arm 30 fulcrumed in the bracket 31 on the frame, and a portion 32 secured to the differential housing 33 (see Figures 1 and 3). A resilient element in the form of two leaf springs 34 connects the rigid arm portions 30 and 32 and thereby give the required freedom of action for the front arm of each rear wheel suspension. The rear arm of the suspension consists of a portion 35 (see Figure 3) secured by a bracket 36 to the differential housing 33 and has a hinged or pivotal connection or joint 37 with an arm portion 38. Said arm portion 38 is constructed with a spring tensioned supporting device in all respects similar to and operating in the same manner as the corresponding support for the rear arm of the front wheel suspension described above.

As with the front wheel support 10 the rear wheel 11 is similarly provided with an additional leaf spring supporting element 28 that is mounted on the differential casing 33 and connected to the chassis frame as heretofore described.

In lieu of the mountings for the free ends of the leaf spring supports described in Figure 1 the arrangement shown in Figures 4 to 8 are provided. In two of these constructions (see Figures 5 and 6) the free ends of the leaf springs 27 are suitably secured to opposite ends of a shaft or bar 39 that extends transversely of the chassis. In the arrangement shown in Figure 5 an annular rubber block 40 is interposed between the bar 39 and a housing 41 secured to the frame 9. A sleeve 42 and two clamping collars 43 serve as a spool support for adjustably mounting the rubber block 40 on the threaded end 44 of the cross bar 39. It is, of course, immaterial whether the rubber block 40 and the housing 41 are mounted interiorly or exteriorly as shown, of the chassis or frame 9, both ways being claimed.

In the construction shown in Figure 6 the arrangement is in all essentials the same as that shown and described in Figure 5. It differs therefrom in that the spring 27 is located outboard of frame 9 as distinct from inside thereof. In this instance said spring 27 engages the extended end portion of the shaft 39.

In the construction shown in Figure 7 the rubber block 40 is mounted on the spring 27 by means of a pair of links 45 that pivotally connect said spring with the pintle bearing 46 as shown. In this instance the housing 47 is modified in construction to fit entirely around the side portion of the frame bar 9. In the arrangement shown in Figure 8 the spring 27 engages the outer end of a stub shaft 48 which on its inner end carries the spool supporting the cushioning block 40.

It will be understood, of course, that the shaft 39 extending transversely of the chassis carries at either end a cushioning block 40. And it will be further noted that in the functioning of the body support all working of the spring ends act through said shaft 39 to compress the rubber blocks 40 within their housings and thereby resiliently takes up or cushions all vibration to which the vehicle wheel is subjected.

From the foregoing it will be readily understood that a motor vehicle equipped as I have described will possess the best riding qualities. The resilient vehicle spring supported by the resilient cushioning block directly coacts in action and reaction to overcome the periodicity of recoil and rebound when synchronizing occurs as is common in motor vehicles on the market at the present time. Also this ease of riding is greatly accentuated by the lateral action and reaction of the cone elements as they function under the influence of the helical spring and the manner in which the parts are associated. This construction provides an auxiliary suspension and snubbing device which carry the unloaded vehicle, the eliptical springs merely coming into use under loaded conditions.

The resilient mounting of the front end of arm 14 shown in Figure 9 is exactly like that shown in Figure 2 for the rear end of arm 17. In Figure 10 the leaf spring 27 terminates with a loop which is placed around the block 41.

It should be noted that by adjusting either the coil spring 25 or the block 40 the tension of the leaf spring 27 will be correspondingly affected.

It is to be understood that I do not desire to limit myself to the precise details of construction and arrangement herein set forth, as it is obvious that various modifications may be made therein without departing from the essential features of the invention.

What is claimed as new is:

1. In a vehicle construction, the combination of a vehicle frame, an axle, a wheel journalled on the axle, a pair of arms hinged at distal points on the frame, one of said arms being pivoted on the axle and the other rigidly secured thereon, and a spring between the axle and the frame, substantially as set forth.

2. In a vehicle construction, a wheel journalled on the axle, a pair of arms hinged at distal points on the frame, one of said arms being pivoted on the axle and the other rigidly secured thereon, a leaf spring between the axle and the frame, and cushioning means between the frame and the pivoted arm, said cushioning means acting simultaneously in planes at right angles to each other, substantially as set forth.

3. In a vehicle construction, the combination of a vehicle frame, an axle, a wheel journalled on the axle, a pair of arms hinged at distal points on the frame, one of said arms being pivoted on the axle and the other rigidly secured thereon, a leaf spring between the axle and the frame, and cushioning elements between one of said arms and the frame, substantially as set forth.

4. In a vehicle construction, the combination of a vehicle frame, an axle, a wheel journalled on the axle, a rigid arm pivoted on the axle, a resilient arm fulcrumed on the frame, and resilient means associated with said rigid arm and the frame, said resilient means acting simultaneously in planes at right angles to each other, substantially as set forth.

5. In a vehicle construction, the combination of a vehicle frame, an axle, a wheel journalled on the axle, an arm hinged on the frame and rigidly secured on the axle, a second arm hinged on the axle and the frame, resilient means associated with said second arm and the frame, said resilient means acting simultaneously in planes at right angles to each other, and said first arm including flexible elements, substantially as set forth.

In witness whereof, I have hereunto set my hand at Green Bay, Wisconsin, this 11th day of August, A. D. nineteen hundred and twenty-four.

BENJAMIN F. SEYMOUR.